United States Patent [19]

Kleffman et al.

[11] Patent Number: 4,637,668
[45] Date of Patent: Jan. 20, 1987

[54] LOCOMOTIVE SAFETY DEVICE

[76] Inventors: David R. Kleffman, 3921 Park Ridge Rd., North Platte, Nebr. 69101; Leroy V. Phiffer, 7209 Hawthorne Dr., Cheyenne, Wyo. 82009

[21] Appl. No.: 800,323

[22] Filed: Nov. 21, 1985

[51] Int. Cl.$^4$ ............................................. H01R 31/08
[52] U.S. Cl. ........................................ 339/10; 339/19; 340/64; 246/1 R
[58] Field of Search ............ 307/10 AT; 340/53, 47, 340/48, 669, 670, 686, 63, 64; 339/19, 222, 10; 180/287; 246/1 R, 131–133

[56] References Cited

U.S. PATENT DOCUMENTS

| | | | |
|---|---|---|---|
| 3,902,075 | 8/1975 | Oros | 180/287 |
| 4,222,033 | 9/1980 | Brown | 307/10 AT |
| 4,274,080 | 6/1981 | Brunken | 340/64 |

*Primary Examiner*—Neil Abrams
*Attorney, Agent, or Firm*—George R. Nimmer

[57] ABSTRACT

The invention environment is a conventional electrically powered railroad locomotive wherein a main generator powers the underlying traction wheels and wherein an auxiliary generator powers low-voltage locomotive components (such as alarms, wheels directional and acceleration control, etc.) through longitudinally extending electrical circuitry terminating at one or more multi-pins receptacles. The locomotive safety device of the present invention takes the form of a multi-perforate plug removably engageable with selected pins of a locomotive multi-pins receptacle and having internal circuitry tending to enforce the perilous "blue flag" condition of a stopped locomotive, such enforcement including the steps of initially warning the would be operator that the "blue flag" condition exists and thereafter making it practically impossible for such warned operator to initiate locomotive movement. The internal electrical circuitry of the inventive safety device plug also might include ancillary functions such as test switch and performance indicator.

8 Claims, 7 Drawing Figures

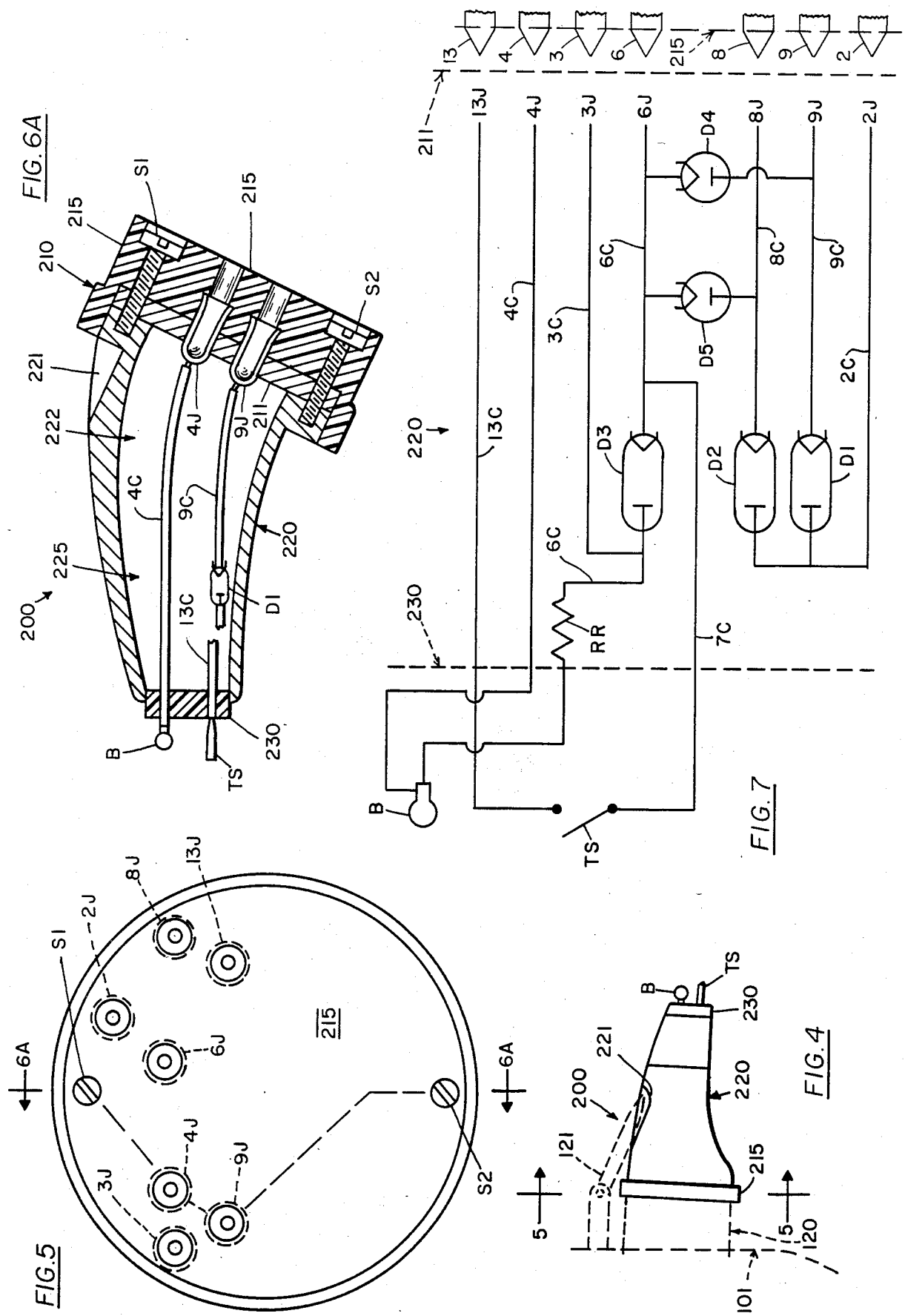

LOCOMOTIVE SAFETY DEVICE

BACKGROUND OF THE INVENTION

Drawing FIG. 1 schematically represents a top plan view of a pair of substantially identical conventional railroad locomotives 100 respectively extending along a common longitudinal-axis 99 and wherein the flanged wheels (W) rest upon track rails 97 and 98 flanking axis 99. In FIG. 1, portions of the locomotive roof are cutaway to expose an upright barrier-partition 100A as the rearward terminus of operator's cab 103 extending toward locomotive forwardend 101 and also as the forward terminus of a power-source compartment 104 extending toward locomotive rearward-end 102. Positioned within compartment 104 is a diesel engine 110 which drives a main-generator 111, the rectified (D.C.) high-voltage electricity therefrom causing traction motors (not shown) to drive the wheels (W) and through the intervention of conventional controls. Such controls are schematically indicated as two levers mounted to a controller-assembly located within cab 103, namely: reverser lever 105 which functions as a forward(105F)-rearward(105R) motive directional control; and throttle lever 106 which functions as acceleration control. Also positioned within power-source compartment 104 is an auxiliary generator 113, the rectified (D.C.) low-voltage electricity therefrom being actuatably connected to appropriate components such as: controls 105 and 106, the exciter field 112 for main-generator 111, audible alarm 107 etc. Other salient features of FIG. 1 include operator's ingress-egress door 109 to compartment 103, transparent windshields (Y), an externally mounted hanger 108, and an alarm device (e.g. audible bell 107) discernable internally and externally of cab 103. Within power-source compartment 104 is one or more valves (e.g. 114) which governs the amount of fuel reaching the diesel engine 110. In a related vein, main-generator 111 requires less fuel and a lower r.p.m. when the locomotive is stopped and the wheels' traction motors have no demand for high-voltage electricity.

Reference characters 120 of FIGS. 1 and 2 are the two multi-pins receptacle terminii of said low-voltage (e.g. 74 volts) electrical circuitry emanating from auxiliary generator 113 and which extends the longitudinal length of each locomotive (100). Individual pins of the multi-pins terminal units 120 are conventionally consecutively numbered from "1" to "27" and are electrically connected to the appropriate low-voltage locomotive component such as, inter alia:

"2" to the discernible alarm (e.g. audible bell 107),
3" to the speed control (e.g. 106 via 114),
"4" to the negative or "ground" of the auxiliary generator (e.g. 113N),
"6" to the exciter circuit (e.g. 112) for the main generator (111),
"8" to the directional control (Forward) (e.g. 105F),
"9" to the directional control (Rearward) (e.g. 105R),
"13" to the low-voltage power of the auxiliary generator (e.g. 113P),
etc.

A conventional two-headed jumper 119, having a plurality of orifices at each head corresponding to the number of pins for the "MU" unit 120, may be conventionally employed to removably electrically connect adjacent locomotives to provide a "consist" of coacting locomotives.

Once the operator has brought the locomotive to a lengthy stop within the railyard and departs from the cab (103), the locomotive becomes a candidate for servicing by railyard maintenance personnel. At this stopped condition, the forward-rearward directional control (105) is in "neutral"; moreover, the acceleration control (106) is at "idle" setting whereby by virtue of unit pins "3" and "6", the continuously running diesel engine 110 is maintained at low r.p.m. whereby no high-voltage D.C. electricity is generated for the wheels (W) traction motors. However, the diesel engine 110 at such low r.p.m. condition is sufficient for generating the low-voltage D.C. electricity for all the "MU" unit (120) circuitry and its "1" to "27" pins.

Inasmuch as such railyard maintenance personnel must oftentimes position themselves adjacent to the wheels (W) or other perilous servicing location, it is imperative that no one within cab 103 be permitted to initiate longitudinal movement of the locomotive. In the latter regard, the locomotive is said to be classified in a dangerous "blue flag" condition as is defined, inter alia, by 49 C.F.R. sections 218.21-218.29. In the prior art, a hooked pole equipped with a blue-colored flag is hung (e.g. at 108) and intended to be viewable through windows (Y) as a warning to cab personnel to refrain from attempting to initiate longitudinal movement to the stopped locomotive. Unfortunately, however, such blue-colored flags are sometimes improperly positioned or cannot be seen through frosted or otherwise obstructed windows whereby the cab personnel are not actually notified of the perilous "blue flag" condition. Unfortunately also, and because of fatigue or other human error, cab personnel unintentionally fail to notice or to heed the hung blue-colored flag.

GENERAL OBJECT OF THE INVENTION

In view of the foregoing, it is the general objective of the present invention to provide an improved, effective, and reliable locomotive safety device for enforcing the perilous "blue flag" condition and including the preliminary step of warning would be operators that the locomotive is classified in the "blue flag" condition and should not be moved, and preferably also making it thereafter practically impossible for such warned but inattentive operators to in fact initiate locomotive movement.

GENERAL STATEMENT OF THE INVENTION

With the above general objective in view, and together with more specific ancillary objectives which will become more apparent as this description proceeds, the locomotive safety device of the present invention generally comprises a multi-perforate plug (e.g. 200) adapted to be removably inserted into electrically conductive relationship with appropriate pins (e.g. "2", "3", "4", "6", "8", "9", and "13") of an "MU" unit (120) whenever the stopped locomotive and having running diesel engine (110) is to be maintained in "blue flag" condition, and by virtue of the multi-perforate plug (e.g. 200) having apt electrically conductive relationship to the appropriate pins of the "MU" unit (120), any errant operational attempt to disregard the locomotive "blue flag" condition will result in affirmative alarm and/or locomotive disablement for movement. For example, the first errant operational attempt i.e. to actuate the forward-rearward directional control (105F or 105R), will cause the electrical current passing through pins "8" or "9" to set off the alarm (e.g. 107) through connected pin "2". The subsequent errant operational attempt i.e. to remove the throttle control (106) from "idle" setting will not in fact initiate locomotive longitudinal movement. For example, in certain styles of diesel locomotives (e.g. General Electric Corp.), if the throttle control (106) is removed from "idle" setting, electrical current passing through pins "3" and "6" and the fuel valve (114) will keep the main generator (110) at low or zero r.p.m. whereby no high-voltage can be generated for the wheels (W) traction motors. But for certain styles of diesel locomotives (e.g. General Motors Corp.) having two separate and conflicting electrically actuated fuel valves, any such errant operational attempt would not significantly involve pin "3"; instead, pins "6", "8", and "9" would be primarily involved whereby the forward-rearward directional control (105) is forceably maintained in the "neutral" condition.

BRIEF DESCRIPTION OF THE DRAWING

In the drawing, wherein like characters refer to like parts in the several views, and in which:

FIG. 4 is a side elevational view of the locomotive safety device and taken along line 4—4 of FIG. 3;

FIG. 5 is a sectional elevational view taken along lines 5—5 of FIGS. 3 and 4;

FIG. 6A is a sectional elevational view taken along line 6A—6A of FIG. 5; and

FIG. 7 is a schematic electrical circuit diagram for the locomotive safety device embodiment (200) of FIGS. 3, 4, 5, and 6A.

DETAILED DESCRIPTION OF THE DRAWING

Figure 1:
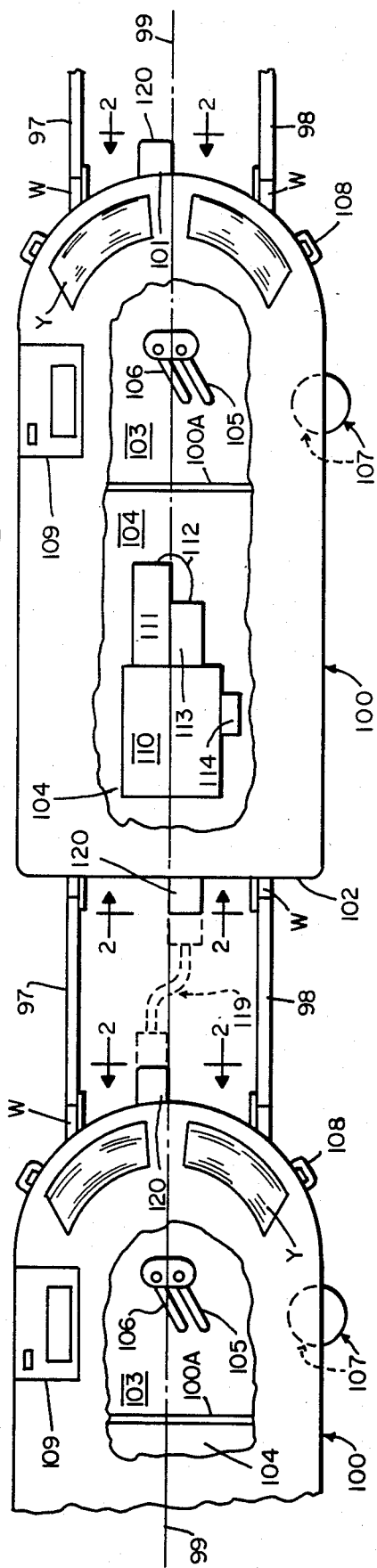
FIG. 1 aforedescribed, is a top plan schematic view of a pair of conventional railroad locomotives.
Figure 3:
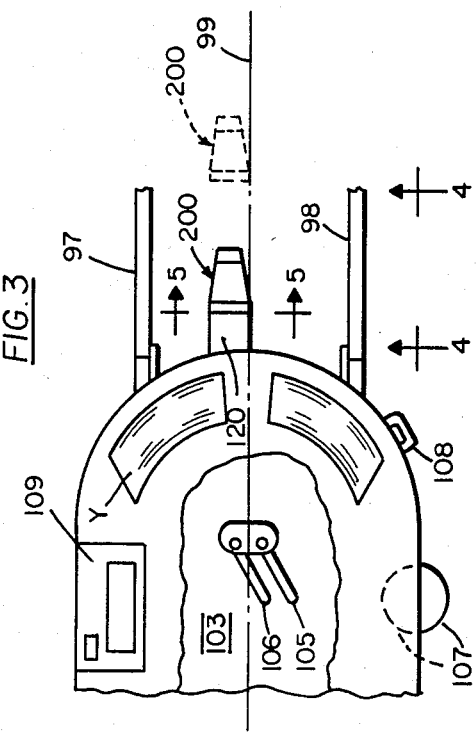
FIG. 3 is a top plan view similar to FIG. 1, but showing a representative embodiment (200) of the locomotive safety device of the present invention removably attached thereto.
Figure 2:
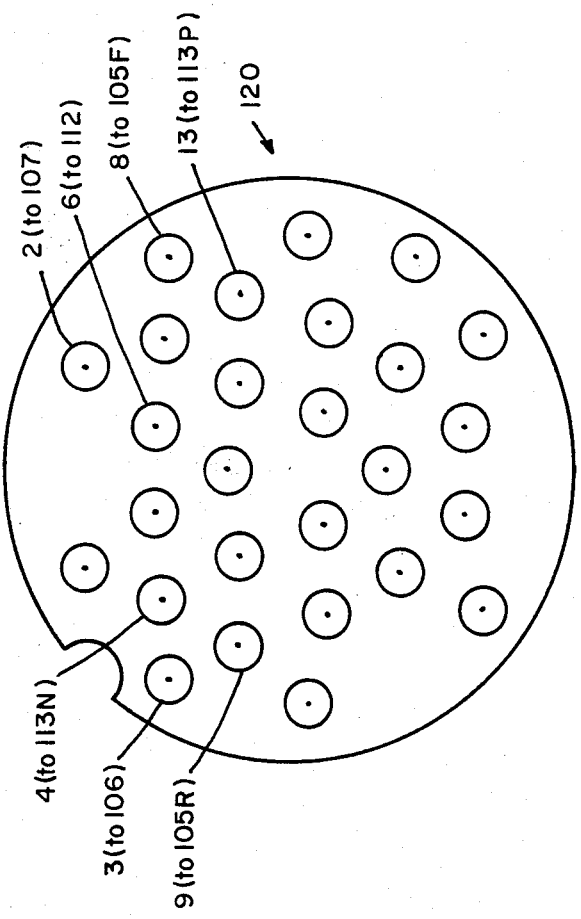
FIG. 2, aforedescribed, is an elevational view taken along lines 2—2 of FIG. 1.

Having already discussed the prior art environment with reference to drawing FIGS. 1 and 2, attention is now turned to drawing FIGS. 3, 4, 5, 6A, and 7 which depict representative embodiment 200 of the locomotive safety device of the present invention. Safety device 200 takes the representative form of a multi-perforate plug and having seven perforations corresponding to the locations of the aforedescribed pins "2", "3", "4", "6", "8", "9", and "13" of the "MU" unit 120. At each of said seven plug perforations there is provided an electrically conductive bushing (e.g. 2J, 3J, 4J, 6J, 8J, 9J, and 13J) and respectively held within an apertured electrically insulative plate (211); such seven plate apertures and bushings correspond to the spaced locations of said pins "2", "3", "4", "6", "8", "9". and "13". The safety device head portion 210 also comprises an electrically insulative rubber pad (215) adhered to said apertured plate (211), the pad (215) also being provided with seven perforations aligned with said seven bushings whereby the seven pins of the "MU" unit might be removably engaged therewith. In addition to head portion 210, safety device embodiment 200 also includes a hollow housing portion 220 which is removably attached to head portion 210 with screws "S1" and "S2", and an electrically insulative cap 230 located remote from head portion 210. Hollow housing 220 includes a read zone 225 provided with said cap 230 and further includes a frontal-zone externally provideable with a recess 221 and against which the "MU" cover-plate (121) might rest.

Seven electrically conductive cables (2C, 3C, 4C, 6C, 8C, 9C, and 13C) are connected to the respective bushings (2J, 3J, 4J, 6J, 8J, 9J, and 13J) and extend rearwardly therefrom within hollow housing 220. The seven cables are interconnected within housing 220 remotely rearwardly of the bushings in the manner schematically indicated in FIG. 7. As also described in FIG. 7, there are intervening electrical gates (e.g. diodes D1, D2, D3, D4, and D5) and which are preferably positioned within housing rear zone 225. Specifically, immediately prior to the interconnection between cables 8C and 9C, there is the intervention of diodes D1 and D2, respectively. In addition, diodes D4 and D5 are desireably connected to cable 6C and intervene between cables 8C and 9C, respectively. The fifth diode D3 intervenes along cable 6C between its branch-cable 7C and the cable 6C connection to cable 3C. An electrical resistor RR (of about 300 ohms value) and light bulb indicator B intervene between cables 4C and 6C. Such light bulb indicator B is mountable at housing cap 230. A test switch TS, that is also mountable at housing cap 230, provides an "on-off" interruptable connection between cables 7C and 13C.

Although already having been alluded to, usage of the locomotive safety device plug (200), and installable onto an "MU" unit (120) of a locomotive (100) under "blue flag" condition, is set forth as follows. Ancillary to usage of the safety device plug (200), the railyard supervisor or a deputy proceeds to a "blue flag" condition locomotive at an "MU" unit (120) devoid of a jumper (119), lifts the cover-plate (121) to expose the 27-pins of the "MU" unit (120), and engages the seven-perforations safety device plug (200) with the similarly spaced and appropriate seven-pins of the "MU" unit. In the latter regard, a comparison of drawing FIGS. 2 and 5 shows that the spacing of the seven-bushings (2J, 3J, 4J, 6J, 8J, 9J, and 13J) is selected to exactly match the conventionally established seven-pins ("2", "3", "4", "6", "8", "9", and "13").

Accordingly, in view of the removably engaged locomotive safety device (200) with the appropriate seven-pins of the "MU" unit (120), such device 200 tends to enforce the perilous "blue flag" condition in the event that would-be locomotive operators might be unaware of, or even intentionally disregard, the "blue flag" condition. In the latter regard, it will be recalled that, in order to initiate longitudinal motion to a stopped locomotive, the operator within cab 103 must perform the following two operational maneuvers:

(i) as a first step, the operator must move the forward-rearward directional control (105) to either the forward (105F) or the rearward (105R) position from the "neutral" setting; and then (ii) as the second step, the operator must move the acceleration control (106) from the "idle" setting to some affirmative setting. Thus, the locomotive safety device plug (200) tends to enforce the "blue flag" locomotive condition as follows. If the would-be operator takes the unauthorized first step (i above), movement of the forward-rearward motive directional control (105) from "neutral" setting will (through connected bushings 2J and 8J or 9J) set off the locomotive alarm (e.g. audible bell 107) which warns the would-be operator of the perilous "blue flag" condition. For the vast majority of cases involving would-be operators who are unaware of the locomotive "blue flag" condition, such warning alarm function of the safety device (200) would wholly suffice for enforcing the "blue flag" condition.

However, if the would-be operator disregards the warning alarm aforedescribed and proceeds further to take the unauthorized second step (ii above), such movement of the acceleration control (106) will be wholly ineffective to supply the high-voltage electricity required for powerably turning the locomotive wheels (W). For example, in certain styles of diesel engine locomotives (e.g. General Electric Corp.), if the throttle control (106) is removed from "idle" setting, electrical current passing through bushings 3J and 6J and the diesel engine fuel valve (114) will keep the main-generator (110) at low or zero r.p.m. value whereby no high-voltage electricity can be generated for the wheels (W) traction motors. But in certain styles of diesel engine locomotives (e.g. General Motors Corp.) having two separate and conflicting electrically actuated fuel valves, any such errant operational attempt will not significantly involve bushing 3J, but instead bushings 6J, 8J, and 9J would be primarily involved. In the latter regard, the forward-rearward motive directional control (105) is thereby forceably maintained in the "neutral" condition whereby whereby any manipulation of the locomotive acceleration control (106) will be wholly inneffective toward the transmission of high-voltage electrical powering means to the locomotive traction wheels (W).

The presence of a power indicator (e.g. light bulb B) and the test switch (TS) on the locomotive safety device (200) performs following ancillary functions. Such power indicator light is for the purpose of visually indicating to locomotive maintenance personnel that the locomotive main generator exciter circuit (112) is being energized whereby personnel should not dis-engage the safety device (200) from the "MU" unit (120) until such exciter circuit is de-energized. The test switch (TS) is for the purpose of testing the power indicator (e.g. B) and the internal circuitry of the safety device (200) each time the device is affirmatively engaged onto the locomotive "MU" unit (120).

From the foregoing, the construction and operation of the locomotive safety device will be readily understood and further explanation is believed to be unnecessary. However, since numerous modifications and changes will readily occur to those skilled in the art, it is not desired to limit the invention to the exact construction shown and described and accordingly, all suitable modifications and equivalents may be resorted to, falling within the scope of the appended claims.

We claim:

1. For the environment of a longitudinally extending and diesel engine type railroad locomotive classified under a stopped and "blue flag" condition, said locomotive having its traction wheels powerable from a high-voltage main-generator, said locomotive also being equipped with a low-voltage auxiliary-generator having electrical circuitry connected to locomotive installed alarm means, to at least one fuel valve for the diesel engine, to locomotive forward-rearward motive directional control, and to locomotive acceleration control, said low-voltage electrical circuitry extending the locomotive longitudinal length and terminating as two endward multi-pins receptacles, the improvement of a locomotive safety device tending to enforce upon would be locomotive operators said "blue flag" condition, said locomotive safety device being adapted to removably engaged with a said locomotive multi-pins receptacle and comprising: a multi-perforate plug including electrically conductive bushings adapted to be removably inserted into electrically conductive relationship with appropriately selected individual pins of said multi-pins receptacle, one of said plug bushings being adapted to removably engage a receptacle pin corresponding to that for the locomotive alarm means and others of said plug bushings being adapted to removably engage receptacle pins corresponding to those for said forward-rearward motive directional control, whereby any attempt by a would be locomotive operator to actuate the forward-rearward motive directional control will set off the alarm means to the discernments of the said interiorally positioned operator and to the externally positioned locomotive maintenance personnel.

2. The locomotive safety device of claim 1 wherein the multi-perforate plug has additional bushings and including at least one adapted to removably engage a receptacle pin corresponding to that for the locomotive acceleration control, whereby any attempt by a would be operator to disregard said set off alarm warning and to actuate the locomotive acceleration control will be wholly ineffective to supply that high-voltage electricity required for powerably turning the locomotive wheels.

3. The locomotive safety device of claim 2 wherein the high-voltage electrical power fails to be generated by the maingenerator in that there is bushing engagement to a receptacle pin connected to an appropriate diesel engine fuel valve whereby the diesel engine is maintained at an r.p.m. value of magnitude insufficient to generate high-voltage electricity through the auxiliary generator.

4. The locomotive safety device of claim 1 wherein the multi-perforate plug has additional bushings and including at least one adapted to removably engage a receptacle pin corresponding to that for the locomotive acceleration control, whereby any attempt by a would be operator to disregard said set off alarm warning and to actuate the locomotive acceleration control will be wholly ineffective to transmit high-voltage electrical powering means to the locomotive traction wheels.

5. The locomotive safety device of claim 4 wherein the power transmission becomes wholly ineffective through electrically controlled maintenance of the forward-rearward motive directional control in the "neutral" condition.

6. The locomotive safety device of claim 1 having the further provision of a power-on indicator means for the main-generator exciter circuit.

7. The locomotive safety device of claim 6 having the further provision of a test switch functioning to test said power-on indicator means.

8. The locomotive safety device of claim 1 having the further provision of a test switch functioning to verify the integrity of the device internal electrical circuitry.

* * * * *